Jan. 1, 1935.  J. A. PERRY  1,986,357
INSULATED PIPE JOINT
Filed Jan. 16, 1933  2 Sheets-Sheet 1
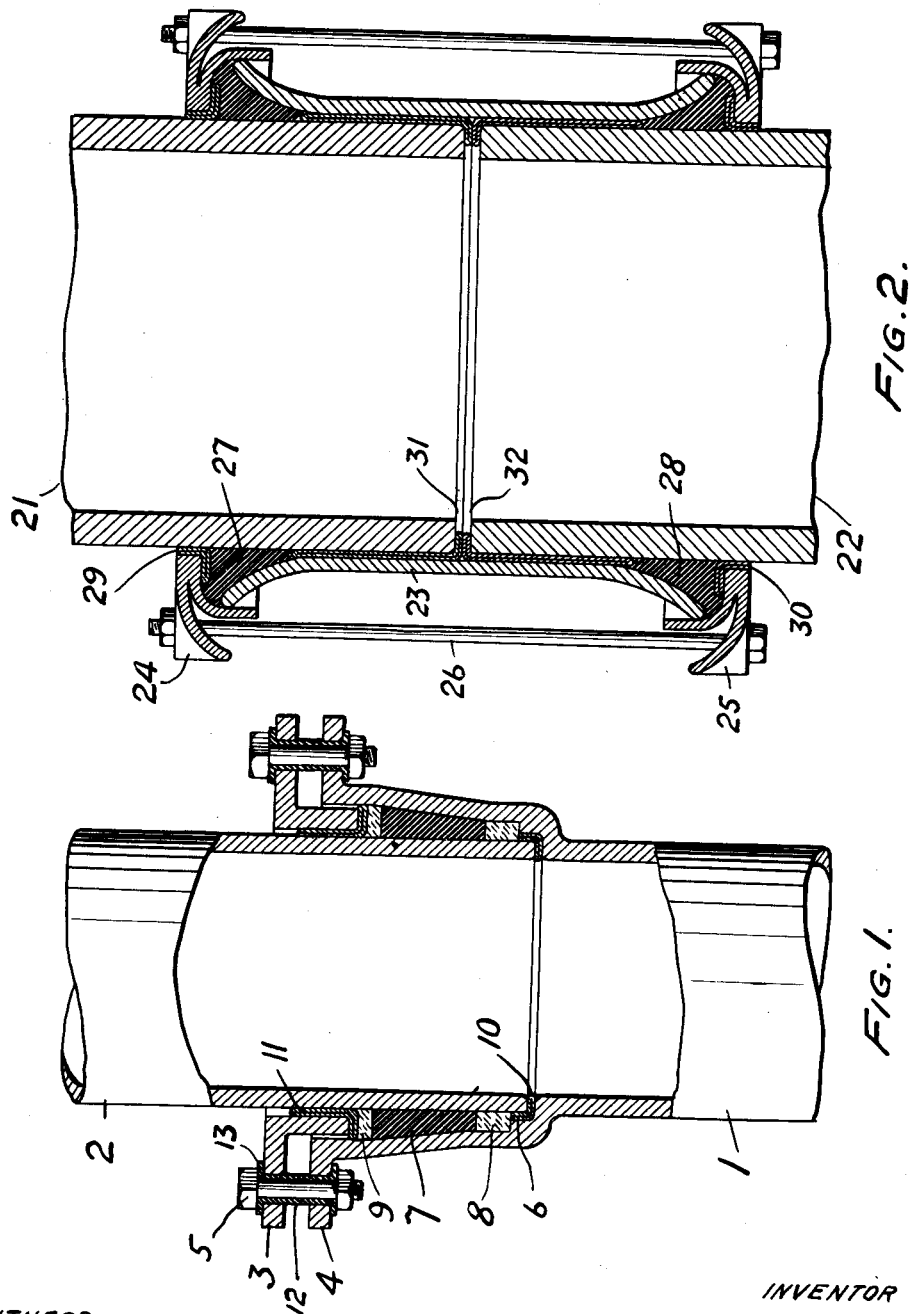
WITNESS:
INVENTOR
Joseph A. Perry
BY
Augustus B. Stoughton
ATTORNEY.

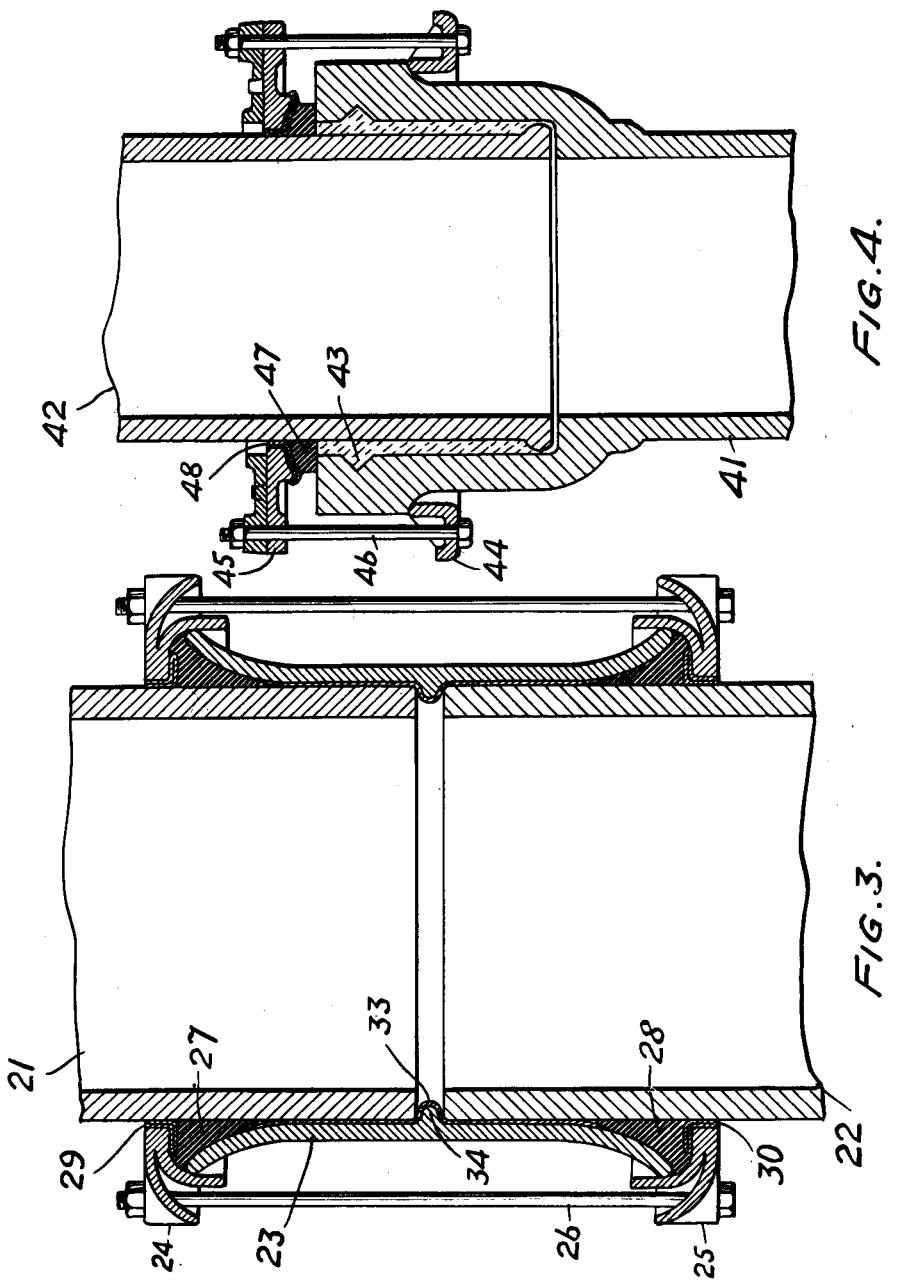

Patented Jan. 1, 1935

1,986,357

UNITED STATES PATENT OFFICE 1,986,357

INSULATED PIPE JOINT

Joseph A. Perry, Swarthmore, Pa., assignor to The United Gas Improvement Company, Philadelphia, Pa., a corporation of Pennsylvania Application January 16, 1933, Serial No. 651,883

8 Claims. (Cl. 285—14)

The present invention relates to electrically insulated joints for metal pipes.

In underground pipe systems such as metal gas mains and water mains, a very considerable expense may be incurred due to electrolytic corrosion of the pipe.

This electrolytic corrosion takes place wherever electric current leaves the pipe to the surrounding soil as metal is carried away from the pipe at rates depending directly upon the amount of current leaving the pipe.

Stray currents from intentionally or accidently grounded electrical systems are frequently picked up and carried by underground metal mains and currents of very considerable magnitude may flow along the pipe and to the soil. Other current flows termed long line currents may be occasioned by variations in the composition of the soil through which the pipe is laid.

For any one definite set of electrical potentials along the pipe, the magnitude of the current flowing along the pipe will depend upon the resistance of the pipe. By increasing the resistance of the pipe by electrically insulating the pipe sections from each other at the joints, the magnitude of the current flowing along the pipe and leaving it to the soil may be greatly reduced, with consequent reduction in the corrosion of the pipe by electrolysis.

It has been previously proposed to employ gasket rings or sleeves of rubber to secure electrical insulation between pipe sections as well as to pack the joint. Rubber is a good insulator and other elastic packings may also have good insulating characteristics. The use of rubber or other elastic packing to seal the joint is desirable as under pressure a very tight joint may be made. Rubber and such packings however have a relatively high cold flow and under the pressure required to make a tight joint, especially when gas tightness is required, may slowly flow or creep out of the ends of the joint and at certain points may be squeezed out so that metallic parts intended to be insulated from each other by the rubber, may come in contact with impairment of the electrical resistance of the joint. The principal object of the present invention is the provision of an improved electrically insulated pipe joint, in which although it may rely on rubber or like elastic packing to seal the joint also provides at critical points preformed insulating means of high electrical resistance and relatively low cold flow as compared with rubber.

The invention will be described in connection with the attached figures which form a part of this specification, and which show forms of the invention chosen for illustration and in which, Fig. 1 shows in section a bell and spigot joint embodying the invention.

Fig. 2 shows in section a sleeve type joint embodying the invention.

Fig. 3 shows in section a modification of the joint of Fig. 2, and

Fig. 4 shows in section the adaptation of the present invention to a leak clamp.

Referring to Fig. 1—

1 generally indicates the bell of a pipe section. 2 generally indicates the spigot of an adjoining pipe section. 3 is a follower ring bolted to the flange 4 on the bell 1 by the bolts 5.

The bell is formed with an annular centering offset indicated at 6 for centering the spigot in the bell. The joint illustrated is provided with the rubber or other elastic packing ring 7 between the packing of caulked jute or other fiber at 8 and 9.

Between the end of the spigot and the bell at the centering offset 6 there is provided the insulating means 10, a preformed member of good electrical insulating characteristic and having a low cold flow as compared with rubber. In the joint illustrated it is in the form of a flanged ring of thin sheet metal such as steel covered on both sides and ends with hard enamel of high electrical resistance and dimensioned to fit over the end of the spigot and to fit within the offset 6.

Between the spigot 1 and the follower ring 3 there is provided the insulating means 11, a preformed member of similar characteristics to means 10. As illustrated it is also a flanged ring formed of sheet metal covered on both sides and ends with hard enamel and dimensioned to space the follower ring from the spigot, the flange extending over the driving end of the follower ring.

In making up the joint illustrated in Fig. 1, the follower ring is put on over the end of the spigot and slipped back, the flanged ring 11 is then put on over the spigot and also slipped back followed by the rubber ring 7. The flanged ring 10 is then fitted over the end of the spigot and the end of the spigot and the ring 10 centered in the offset 6. The packing 8 is then caulked in. The rubber ring 7 is then slipped forward and pushed into the joint against the packing 8 and the packing 9 is caulked in against the rubber ring. The flanged ring 11 is then slipped forward against the packing 9 and the follower ring 3 slipped forward against the flange of ring 11. The bolts are then taken up and the packing compressed in the joint to the desired extent.

If it is desired to insulate the bolts from small local currents which may flow in the bell, insulating means such as the flanged thimble 12 and the washer 13 may be employed.

In place of the separate insulating member 11, a layer of hard enamel may be formed on the inner surface of the follower ring 3 to insulate it from the pipe section 2.

The separate member however has the advantage of providing enamel surfaces on both sides, one side providing adequate insulation in case of scratching of the enamel on the other side. The small members are also easier and cheaper to enamel.

If desired a deeper rubber packing ring may be employed than that illustrated, extending to the offset 6 and the packing 8 and 9 dispensed with. This has the advantage of providing a joint requiring no caulking and saving time in assembly.

Referring to Fig. 2—

21 and 22 generally indicate adjoining pipe sections. 23 is a sleeve, 24 and 25 are clamp rings bolted together by the bolt 26; 27 and 28 are elastic packing rings, for instance of rubber.

29 is a preformed insulating member of high electrical resistance and low cold flow as compared with rubber arranged between the clamp 24 and the pipe section 21. In the joint illustrated it is in the form of an annular flanged ring of sheet metal for instance steel, covered on both sides and ends with hard enamel of high electrical resistance.

30 is a preformed member similar to 29 and arranged between the clamp 25 and the pipe section 22.

Between the sleeve 23 and the pipe sections there is also provision of preformed insulating means of high electrical resistance and low cold flow as compared with rubber. In the joint illustrated these means consist of two flanged sleeves 31 and 32 formed of thin sheet metal covered on both sides and ends with hard enamel of high electrical resistance. Sleeve 31 is arranged between the sleeve 23 and pipe section 21, while sleeve 32 is arranged between the sleeve 23 and the pipe section 22, the flanges of the sleeves fit over the ends of the respective pipe sections and insulate them from each other.

In making up the joint illustrated in Fig. 2, the clamp ring 24 is slipped on over the end of pipe section 21 and slipped back, as is the flanged ring 29 and the rubber ring 27. The flanged sleeve 31 is then fitted over the end of the pipe section 21. The clamp ring 25 and the flanged ring 30 and the rubber ring 28 are put on over the end of pipe section 22 and slipped back. The flanged sleeve 32 is then fitted over the end of pipe section 22. The sleeve 23 is then slipped over the end of one of the pipe sections for instance section 21 and slipped back. The pipe sections are then brought together with the flanges of sleeves 31 and 32 abutting. Sleeve 23 is slipped forward to the position shown in the figure. The rubber rings 27 and 28 are slipped forward into the spaces between the ends of the sleeve 23 and the pipe sections, the flanged rings 29 and 30 are then slipped forward against the rubber rings and the clamp rings 24 and 25 against the flanged rings 29 and 30. The bolts are then put through the clamp rings and taken up compressing the rubber packing in the joint to the desired extent.

Instead of making the flanged sleeves 31 and 32 separate as shown in Fig. 2, they may be united in one sleeve provided with an annular interior projection extending between in ends of the pipe sections in the manner that the flanges of rings 31 and 32 are shown to extend in the figure.

Referring to Fig. 3—

The joint shown is a modification of the apparatus of Fig. 2 and is identical except that the flanged insulating sleeves 31 and 32 of Figure 2 are not employed being replaced by a layer of hard enamel of high electrical resistance formed on the inner surface of the sleeve 23 and preventing contact between the metal of the sleeve and the pipe sections. This layer of enamel is indicated at 33, the sleeve 23 is provided with the annular projection 34 on its inner surface to prevent contact between the ends of the pipe sections. This projection takes the place of the flanges of the sleeves 31 and 32 in Fig. 2. Other parts are identical with like numbered parts in Fig. 2.

The assembly of the joint is the same as in Fig. 2 with the exception that the sleeve 23 after being put on over pipe section 21 for instance can only be slipped back until the end of the section abuts the projection 34 and the other pipe section must be inserted in the sleeve 23 instead of slipping the sleeve forward over it.

The separate insulating members 29 and 30 may be replaced by forming a layer of hard enamel on the surfaces of the clamp rings positioned to prevent contact between the clamp rings and the pipe sections. The separate members, however, have the advantage of being covered with enamel on both sides so that if the enamel on one side is scratched or otherwise impaired in making up the joint the enamel on the other side insures the insulation. In Fig. 2 for instance four layers of enamel are interposed between the ends of the adjoining pipe sections.

Referring to Fig. 4—

Some joints as for instance bell and spigot joints with cement packing may have fairly high electrical resistance. If such a joint leaks and the ordinary leak clamp is employed to stop the leakage, the electrical resistance of the joint may be greatly reduced. Fig. 4 illustrates the application of the present invention in such a case.

41 generally indicates the bell of a pipe section.

42 generally indicates the spigot of an adjoining section.

43 indicates cement packing in the joint.

44 and 45 indicate leak clamp rings bolted together, by bolts as 46.

47 indicates an elastic packing ring for instance of rubber.

The clamp rings 44 and 45 and the rubber ring 47 are assembled from sections so that they may be fitted around the joint in place.

Between the clamp ring 45 and the pipe section 42 is provided the preformed insulating member 48 of the high resistance and low cold flow as compared to rubber. In the figure this member is illustrated as a ring of thin metal sheet as for instance steel covered with enamel on both sides and ends, having a flange extending between the clamp ring 45 and the pipe section 42 and another flange extending between the ring 45 and the end of the bell 41 to prevent metallic contact between the clamp and the bell should the clamp be drawn up sufficiently. This member 48 is also made sectional so that it may be fitted around a pipe in place.

In place of the member 48 a layer of hard enamel might be formed on the surface of the clamp ring 45 covering the portion of the clamp shown in contact with the member 48 in Figure 4. The member 48 has the merit however of providing two enamel surfaces, one surface ensuring the insulation of the clamp from the pipe in case of the scratching of the other.

In repairing a leak, the ring 44 is assembled around the bell 41 on back of the bell shoulder, the rubber packing ring 47, the member 48 and the clamp ring 45 are assembled around the section 42 with the rubber ring against the end of the bell and the joint packing 43 and the member 48 between the clamp ring 45 and the pipe section 42 and between the clamp ring 45 and the rubber ring 47. The bolts are then drawn up and the rubber ring compressed against the face of the leaking joint to the desired extent.

In describing the various figures particular reference has been made to the employment of enamel and to the use of insulating members formed by covering thin sheet metal with enamel. It is not desired to so limit the invention. Insulating members of other composition may be employed providing they have the characteristics of high electrical resistance and low cold flow as compared with rubber. For instance the separate insulating members illustrated in figures might be formed of bakelite. Care should be taken as to the effect of the fluid transported through the pipe upon the insulating members with which the fluid may come in contact. Thus if manufactured gas is conveyed through the pipe the material employed in the insulating members should be such as will not be destroyed by constituents in the gas.

I do not intend to be limited in the practice of my invention save as the scope of the prior art and of the attached claims may require.

I claim:

1. An electrically insulated pipe joint comprising in combination two adjacent pipe sections, an electrically insulating element interposed between said pipe sections to form a tight joint therebetween, a second electrically insulating element which is preformed and has a lower cold flow than said first mentioned element, and means for fastening said pipe sections together electrically insulated from one of said pipe sections by said second mentioned element.

2. An electrically insulated pipe joint comprising in combination a pair of adjacent pipe sections, a sleeve surrounding the joint between said pipe sections, a plurality of first electrically insulating means each adjacent an end of said sleeve for providing a tight joint between said sleeve and the adjacent pipe section, second preformed electrically insulating means having a lower cold flow than said first means interposed between said sleeve and said pipe sections and overlying the ends of said pipe sections, a plurality of third preformed electrically insulating means having a lower cold flow than said first means, each contacting one of said first means on the opposite side from said second means, and fastening means for connecting said pipe sections and for applying pressure to said first and said second and said third means, said fastening means being electrically insulated from said pipe sections by said third means.

3. An electrically insulated pipe joint comprising in combination, a section of pipe having a bell thereon, an adjacent section of pipe having a spigot thereon, preformed electrically insulating means providing a tight joint between said pipe sections, a second preformed electrically insulating means having a lower cold flow than said first mentioned means providing a tight joint between said pipe sections, and fastening means for fastening said pipe sections together and for exerting pressure upon said first and said second mentioned means, said fastening means being electrically insulated from one of said pipe sections by said second mentioned means.

4. An electrically insulated pipe joint comprising in combination, a pair of adjacent pipe sections, a sleeve surrounding the joint between said pipe sections, a pair of rings of rubber surrounding said pipe sections adjacent the ends of said sleeve, a first electrically insulating means of lower cold flow than said rings interposed between said sleeve and said pipe sections, means for clamping said sleeve to said pipe sections and for compressing said rings against said sleeve and said pipe sections and said first means, and flanged rings of sheet metal covered with electrically insulating material of lower cold flow than said rings interposed between said last mentioned means and said rings and said pipe sections.

5. An electrically insulated pipe joint comprising in combination, a pair of adjacent pipe sections, a sleeve surrounding the joint between said pipe sections, a lug on said sleeve adapted to enter the joint between said pipe sections, a pair of rings of rubber surrounding said pipe sections adjacent the ends of said sleeve, a first electrically insulating means of lower cold flow than said rings interposed between said sleeve and said pipe sections, means for clamping said sleeve to said pipe sections and for compressing said rings against said sleeve and said pipe sections and said first means, and flanged rings of sheet metal covered with electrically insulating material of lower cold flow than said rings interposed between said last mentioned means and said rings and said pipe sections.

6. An electrically insulated pipe joint comprising in combination, two adjacent pipe sections, a preformed rubber insulating element adjacent the joint between said pipe sections and interposed between said joint and the exterior of said pipe sections, a second electrically insulating element which is preformed and which has a lower cold flow than said first-mentioned element, and means for fastening said pipe sections together electrically insulated from one of said pipe sections by said second-mentioned element.

7. An electrically insulated pipe joint comprising in combination, two adjacent pipe sections, an electrically insulating element adjacent the joint between said pipe sections and interposed between said joint and the exterior of said pipe sections, a second electrically insulating element preformed of metal having an insulating coating thereon and having a lower cold flow than said first-mentioned element, and means for fastening said pipe sections together electrically insulated from one of said pipe sections by said first-mentioned element.

8. An electrically insulated pipe joint comprising in combination two adjacent pipes, a rubber insulating element adjacent the joint between said pipes, a second insulating element preformed of metal with a coating of insulating material thereon, and means for fastening said pipe sections together compressing said rubber element and said second element to close the joint between said pipes, said fastening means being insulated from one of said pipes by said second element.

JOSEPH A. PERRY.